US011562153B1

(12) United States Patent
Etwaru et al.

(10) Patent No.: US 11,562,153 B1
(45) Date of Patent: Jan. 24, 2023

(54) SYSTEMS AND METHODS FOR RECOGNIZABILITY OF OBJECTS IN A MULTI-LAYER DISPLAY

(71) Applicant: MOBEUS INDUSTRIES, INC., Sparta, NJ (US)

(72) Inventors: Dharmendra Etwaru, Sparta, NJ (US); David Casper, St. Pete Beach, FL (US)

(73) Assignee: MOBEUS INDUSTRIES, INC., Sparta, NJ (US)

(*) Notice: Subject to any disclaimer, the term of this patent is extended or adjusted under 35 U.S.C. 154(b) by 0 days.

(21) Appl. No.: 17/708,656

(22) Filed: Mar. 30, 2022

Related U.S. Application Data

(60) Provisional application No. 63/248,800, filed on Sep. 27, 2021, provisional application No. 63/222,757, filed on Jul. 16, 2021.

(51) Int. Cl.
  G06F 40/58 (2020.01)
  G06F 3/04842 (2022.01)
  G06V 10/20 (2022.01)
  G06V 10/764 (2022.01)

(52) U.S. Cl.
  CPC .......... *G06F 40/58* (2020.01); *G06F 3/04842* (2013.01); *G06V 10/255* (2022.01); *G06V 10/764* (2022.01)

(58) Field of Classification Search
  CPC ... G06F 40/58; G06F 3/04842; G06V 10/255; G06V 10/764
  See application file for complete search history.

(56) References Cited

U.S. PATENT DOCUMENTS

| | | |
|---|---|---|
| 7,013,428 B1 | 3/2006 | Kamen |
| 8,813,154 B1 | 8/2014 | Sivertsen |
| 9,325,809 B1 | 4/2016 | Barros et al. |
| 9,411,789 B1 | 8/2016 | Chitta |
| 9,792,895 B2 | 10/2017 | Khintsitskiy |
| 9,924,236 B2 | 3/2018 | Nguyen |
| 10,089,633 B2 | 10/2018 | Thlyagarajan |
| 10,236,006 B1 | 3/2019 | Gurijala et al. |

(Continued)

OTHER PUBLICATIONS

International Search Report and Written Opinion of the International Searching Authority issued Nov. 23, 2021, in PCT/US 21/46976, filed Aug. 20, 2021, 10 pages.

(Continued)

*Primary Examiner* — Qian Yang
(74) *Attorney, Agent, or Firm* — Oblon, McClelland, Maier & Neustadt, L.L.P.

(57) ABSTRACT

A method, system, and computer-readable media of generating a display on a device, including combining content from a plurality of sources into a display, the content from each of the plurality of sources being presented as a layer of the display, and further, each layer of the display being of substantially the same dimensions, detecting one or more objects in each layer of the generated display, and for one or more of the detected objects determining an object type or classification, determining if the object is overlapping or obscuring an object in a different layer of the generated display, and determining if the object will appear to a viewer as if it will overlap or obscure an object in a different layer of the generated display as a result of the motion, orientation, or gaze of the viewer.

20 Claims, 8 Drawing Sheets

(56) References Cited

U.S. PATENT DOCUMENTS

| | | | |
|---|---|---|---|
| 10,567,733 | B2 | 2/2020 | Cole |
| 10,742,634 | B1 | 8/2020 | Shahbazi et al. |
| 10,853,903 | B1 | 12/2020 | Deshmukh |
| 11,064,149 | B1 | 7/2021 | Paun |
| 11,475,610 | B1 | 10/2022 | Etwaru |
| 2002/0056136 | A1 | 5/2002 | Wistendahl et al. |
| 2003/0234790 | A1 | 12/2003 | Hochmuth |
| 2004/0130552 | A1 | 7/2004 | Duluk, Jr. et al. |
| 2005/0219241 | A1 | 10/2005 | Chun |
| 2006/0242607 | A1 | 10/2006 | Hudson |
| 2007/0009179 | A1 | 1/2007 | Easwar |
| 2007/0156708 | A1 | 7/2007 | Takayama |
| 2008/0066092 | A1 | 3/2008 | Laude et al. |
| 2008/0137848 | A1 | 6/2008 | Kocher et al. |
| 2008/0140714 | A1 | 6/2008 | Rhoads et al. |
| 2008/0152016 | A1 | 6/2008 | Nagahara |
| 2009/0245516 | A1 | 10/2009 | Ravikiran |
| 2010/0153848 | A1 | 6/2010 | Saha |
| 2011/0304646 | A1 | 12/2011 | Kato |
| 2012/0032977 | A1 | 2/2012 | Kim et al. |
| 2012/0088543 | A1 | 4/2012 | Lindner et al. |
| 2012/0095958 | A1 | 4/2012 | Pereira et al. |
| 2012/0114249 | A1 | 5/2012 | Conwell |
| 2012/0169928 | A1 | 7/2012 | Casagrande et al. |
| 2012/0207208 | A1 | 8/2012 | Wyatt |
| 2012/0272279 | A1 | 10/2012 | Lim |
| 2013/0044129 | A1 | 2/2013 | Latta et al. |
| 2013/0047180 | A1 | 2/2013 | Moon et al. |
| 2013/0183952 | A1 | 7/2013 | Davis et al. |
| 2013/0294648 | A1 | 11/2013 | Rhoads et al. |
| 2014/0172429 | A1 | 6/2014 | Butcher et al. |
| 2014/0201769 | A1 | 7/2014 | Neumeier et al. |
| 2014/0304316 | A1 | 10/2014 | Thulasiraman et al. |
| 2015/0039993 | A1 | 2/2015 | Ishimaru |
| 2015/0074735 | A1 | 3/2015 | Herigstad et al. |
| 2015/0097850 | A1 | 4/2015 | Craik et al. |
| 2015/0113557 | A1 | 4/2015 | Kim |
| 2015/0163345 | A1 | 6/2015 | Cornaby |
| 2015/0195288 | A1 | 7/2015 | Hoyos et al. |
| 2015/0287220 | A1 | 10/2015 | Jain et al. |
| 2015/0034141 | A1 | 11/2015 | Schrempp |
| 2015/0319510 | A1 | 11/2015 | Ould Dellahy, VIII |
| 2015/0358525 | A1 | 12/2015 | Lord |
| 2016/0109954 | A1 | 4/2016 | Harris |
| 2016/0328871 | A1 | 11/2016 | Chen |
| 2017/0026621 | A1 | 1/2017 | Vellanki et al. |
| 2017/0052654 | A1* | 2/2017 | Cervelli ............... G06F 16/29 |
| 2017/0155933 | A1 | 6/2017 | Del Strother |
| 2017/0185251 | A1 | 6/2017 | Jain |
| 2017/0195753 | A1 | 7/2017 | Dakss |
| 2017/0255614 | A1 | 9/2017 | Vukosavljevic et al. |
| 2017/0278289 | A1 | 9/2017 | Marino et al. |
| 2017/0304725 | A1 | 10/2017 | Perlman et al. |
| 2017/0344552 | A1 | 11/2017 | Golbandi |
| 2018/0004204 | A1 | 1/2018 | Rider |
| 2018/0046602 | A1 | 2/2018 | Sisson |
| 2018/0096502 | A1 | 4/2018 | Kansara |
| 2018/0122114 | A1* | 5/2018 | Luan ............... H04N 21/812 |
| 2018/0124370 | A1 | 5/2018 | Bejot |
| 2018/0143950 | A1 | 5/2018 | Al-Arnaouti et al. |
| 2018/0150696 | A1 | 5/2018 | Li |
| 2018/0189922 | A1 | 7/2018 | Chinnadurai et al. |
| 2018/0219814 | A1 | 8/2018 | Maarek |
| 2018/0307846 | A1 | 10/2018 | Hertling et al. |
| 2018/0308257 | A1 | 10/2018 | Boyce |
| 2018/0343481 | A1 | 11/2018 | Loheide et al. |
| 2019/0065152 | A1 | 2/2019 | Jaroch |
| 2019/0206113 | A1 | 7/2019 | Kipp et al. |
| 2019/0207885 | A1 | 7/2019 | Kozhemiak et al. |
| 2019/0213625 | A1 | 7/2019 | Bhattacharjee |
| 2019/0236816 | A1 | 8/2019 | Wang et al. |
| 2019/0259124 | A1 | 8/2019 | Barnett |
| 2019/0295208 | A1 | 9/2019 | Hoatry |
| 2019/0317763 | A1* | 10/2019 | Sakamoto ............... A63F 13/79 |
| 2019/0332883 | A1 | 10/2019 | Ivanovic |
| 2019/0335233 | A1 | 10/2019 | Harvey |
| 2020/0110482 | A1 | 4/2020 | Vu et al. |
| 2020/0162788 | A1 | 5/2020 | Cremer |
| 2020/0169736 | A1 | 5/2020 | Petajan |
| 2020/0184658 | A1 | 6/2020 | Cui |
| 2020/0245021 | A1 | 7/2020 | Kitazato |
| 2020/0257920 | A1 | 8/2020 | Kumar et al. |
| 2020/0273251 | A1 | 8/2020 | Palos et al. |
| 2020/0389293 | A1 | 12/2020 | Lambert et al. |
| 2020/0396521 | A1 | 12/2020 | Weiner et al. |
| 2021/0004650 | A1 | 1/2021 | Frank |
| 2021/0168416 | A1 | 6/2021 | Weiner |
| 2021/0192302 | A1 | 6/2021 | Wang |
| 2021/0200501 | A1 | 7/2021 | Stankoulov |
| 2021/0344991 | A1 | 11/2021 | Todd |
| 2022/0019780 | A1 | 1/2022 | Ozserin et al. |
| 2022/0067415 | A1 | 3/2022 | Kerofsky |
| 2022/0105193 | A1 | 3/2022 | Rockel |
| 2022/0114584 | A1 | 4/2022 | Conley et al. |
| 2022/0138994 | A1 | 5/2022 | Viswanathan et al. |

OTHER PUBLICATIONS

International Search Report and Written Opinion of the International Searching Authority dated Jun. 1, 2022, in PCT/US22/20244, filed Mar. 14, 2022, 12 pages.

International Search Report and Written Opinion of the International Searching Authority dated Jun. 9, 2022, in PCT/US22/20226, filed Mar. 14, 2022, 12 pages.

International Search Report and Written Opinion of the International Searching Authority dated Jun. 9, 2022, in PCT/US22/20234, filed Mar. 14, 2022, 8 pages.

International Search Report and Written Opinion of the International Searching Authority dated Jun. 9, 2022, in PCT/US 22/20184, filed Mar. 14, 2022, 8 pages.

International Search Report and Written Opinion of the International Searching Authority dated Jun. 3, 2022, in PCT/US2022/020254, filed Mar. 14, 2022, 13 pages.

International Search Report and Written Opinion of the International Searching Authority dated Jun. 7, 2022, in PCT/US2022/022840, filed Mar. 31, 2022, 8 pages.

International Search Report and Written Opinion of the International Searching Authority dated Jul. 20, 2022, in PCT/US22/20263, filed Mar. 14, 2022, 9 pages.

International Search Report and Written Opinion of the International Searching Authority dated Aug. 3, 2022, in PCT/US22/20215, filed Mar. 14, 2022, 10 pages.

International Search Report and Written Opinion of the International Searching Authority dated Aug. 1, 2022, in PCT/US22/20267, filed Mar. 14, 2022, 12 pages.

International Search Report and Written Opinion of the International Searching Authority dated Jul. 7, 2022, in PCT/US22/20258, filed Mar. 14, 2022, 9 pages.

Demuynck et al., 'Magic Cards: A New Augmented-Reality Approach', IEEE Computer Graphics and Applications, pp. 12-19. (Year: 2013).

Oh et al., 'CAMAR: Context-aware Mobile Augmented Reality in Smart Space', IWUVR, pp. 48-51. (Year: 2009).

\* cited by examiner

SYSTEMS AND METHODS FOR RECOGNIZABILITY OF OBJECTS IN A MULTI-LAYER DISPLAY

CROSS REFERENCE TO RELATED APPLICATIONS

The present application claims priority to U.S. Provisional Application No. 63/248,800, filed Sep. 27, 2021, and U.S. Provisional Application No. 63/222,757, filed Jul. 16, 2021, the entire content of each of which is incorporated by reference herein in its entirety for all purposes. U.S. application Ser. No. 17/675,950, filed Feb. 18, 2022, and U.S. application Ser. No. 17/675,975, filed Feb. 18, 2022, are also incorporated by reference herein in their entirety for all purposes.

BACKGROUND

Enabling a person to effectively understand and interact with displayed content is important in many situations. However, as the types of content and the complexity of information increase, single-layer displays become more cluttered with objects and less effective at communicating information and assisting users to perform tasks.

Embodiments of the disclosure are directed to overcoming this and other disadvantages of previous approaches.

SUMMARY

The terms "invention," "the invention," "this invention," "the present invention," "the present disclosure," or "the disclosure" as used herein are intended to refer broadly to all the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

The present disclose is directed to a method, system, and computer-readable media of generating a display on a device, including combining content from a plurality of sources into a display, wherein the content from each of the plurality of sources is presented as a layer of the display, and further, wherein each layer of the display is of substantially the same dimensions; detecting one or more objects in each layer of the generated display; and for one or more of the detected objects determining an object type or classification; determining if the object is overlapping or obscuring an object in a different layer of the generated display; determining if the object will appear to a viewer as if it will overlap or obscure an object in a different layer of the generated display as a result of the motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modifying a characteristic of the object based on a rule or trained model.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which.

Note that the same numbers are used throughout the disclosure and figures to reference like components and features.

DETAILED DESCRIPTION

Figure 1:
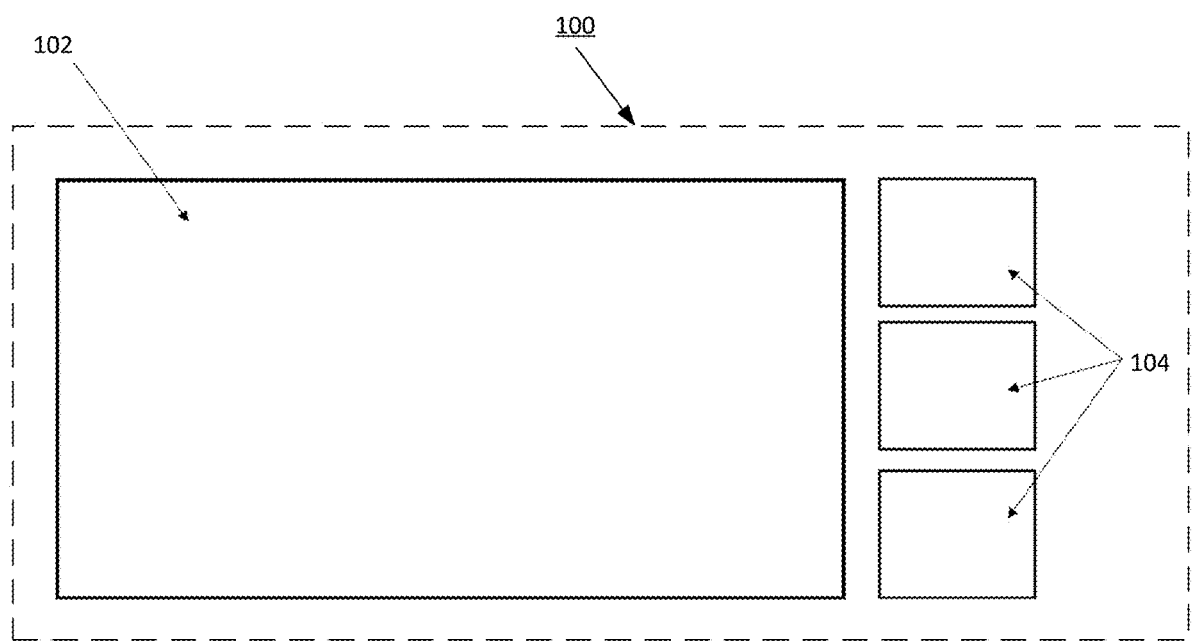
FIG. 1 is a diagram illustrating a typical display generated by a conventional process for a video conference application.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

One approach that may reduce clutter and more effectively communicate information is to display objects in different layers by constructing a multi-layer display. However, when viewing a display which includes multiple layers with different objects in each layer, an object or text in one layer may be difficult to discern if it is even partially obscured by an object or text in another layer. Further, when there are multiple objects from multiple sources composited and presented together, a human or computer desiring to select one or more such objects may not be able to in an effective way.

Thus, in some embodiments, one or more of the disclosed functions and capabilities may be used to enable a form of "touchless computing" wherein a user's gaze, gestures, movements, position, orientation, or other characteristics observed by a camera are used as the basis for selecting objects and executing processes on a computing device. Further, because the opacity of pixels in different layers may be adjusted to improve viewing and recognizability of objects in one or more of the displayed layers of a multi-layer display, this may also be considered a form of "transparent computing." This type of computing experience may include the presentation of a plurality of objects or content distributed among multiple layers. Transparent computing may also include the ability of a user to interact with a 3-dimensional environment, for example by introducing an image of an object into a layer and interacting with the object as part of performing a task.

This disclosure is directed to systems, devices, and methods for multi-layer display. In some embodiments, the systems and methods described herein may be used to improve the recognizability of objects in different layers of a multi-layer display, where recognizability as used herein refers to the ability of a user to identify, select, or interact with an object in one layer of a multi-layer display. As will be described, the recognizability of an object can be reduced by a situation in which an object in one layer is obscured by or overlaps (either partially or completely) an object in another layer of the multi-layer display. The recognizability of an object in one layer can also be reduced when it or an object in another layer is re-positioned by a user or application. Embodiments improve the recognizability of objects that may be presented in different layers, thereby enabling a user or a computing device to interact with those objects more effectively, such as by selecting an intended object. In some embodiments, improving the recognizability of an object may involve changes to appearance, resolution, contrast, position, or other aspects of an object relative to those of an object in a different layer of a multi-layer display.

Embodiments are directed to solutions to the described limitations in the presentation and use of multi-layer displays, particularly those formed from composite sources. These solutions include (1) a method to dynamically re-arrange the position(s) of one or more visual objects, (2) a method to dynamically adjust the relative visual attributes of one or more visual objects in a layer or layers of a multi-layer display (including but not limited to brightness, contrast, color, opacity, resolution, etc.), and (3) a method that dynamically adjusts both positions and attributes of objects. As described and referred to herein, a "visual object" is comprised of one or more pixels in a digital graphical format (e.g., digital picture, digital video, or video frame buffer) that represent an element or construct to a human and/or to a machine.

In one embodiment, the disclosure is directed to a method for a multi-layer display that prevents the apparent overlap (and in some cases, the possible overlap arising from user or application actions) between objects in different layers of a display, such as the obscuration (either partially or completely) of an object in one layer by an object in another layer of the display. As will be described, the apparent or possible overlap (sometimes referred to as an occlusion or blockage) of one object by another may be the result of an object's placement in a layer relative to an object in another layer, an object's motion, or a viewer's perspective. In one embodiment, the data processing flow and associated logic implemented as part of the method may comprise:

Detect objects in one or more layers of a display;
  In some embodiments, this may be accomplished by accessing and inspecting a video frame buffer of a source (such as a camera, computing device, etc.) of the objects or content displayed in each layer;
  In some embodiments, this may be accomplished by use of image recognition, a trained model, or computer vision techniques to identify and classify an object in a layer of a multi-layer display formed from a composite of multiple sources;
Once the objects in each of the layers formed from a composite of sources have been detected, the method may determine the type or category of each object, where the type or category may be one of, but is not limited to "alphabetic text," "geometric shape," "window of an open, running application," "human hand, face, or body," etc.;
  In one embodiment, this determination may be performed by use of a trained model. For example, a trained machine learning (ML) model may be generated by "showing" it a sufficient number of correctly labeled examples (e.g., multiple variations of images of a human hand, labeled as "human hand"). The trained model is then able to recognize a human hand (or other object it has been trained to classify) in new data that it has not "seen" before;
  In one embodiment, such a trained model may be in the form of a convolutional neural network (CNN) that can be used to identify and classify an object as to its type or category;
Next, the method may determine how to further process one or more of the detected objects, based on the identified type or classification of the object (such as human hand, head, animal, active application window, etc.);
  As an example, in one embodiment, this processing may be determined by evaluating each of a set of rules, and implementing the result of the rules that are satisfied;
    For example, if a human profile is detected, then the method may extract the human profile from the remainder of a webcam video feed ("background subtraction") and replace it with a digital version. One reason for a digital replacement may be to re-insert one or more of digital replacements back into the composite, with adjustments to color, brightness, contrast, size, or resolution to improve the ability of a user to recognize and interact with the object;

This type of processing may be performed to address a "limitation of view" problem so that the human profile is no longer "lost" in the busyness of the composite graphics, but instead is more noticeable in the "scene," thereby improving communication and understanding of the content;

Similarly, if a visual object is determined to be alphabetic text, then the method may re-introduce one or more digital copies of the text back into the composite graphics, with adjustments to color, brightness, or contrast. This type of processing may be performed so that the presented text is easier to read and comprehend for a viewer;

In some embodiments, the method may not only change the visual attributes of one or more objects (such as color, brightness, resolution, or contrast), but may also (or instead) automatically move the position, size, and/or orientation of one or more of the objects;

As an example, if a presenter's eye in a video image is occluding one or more objects on a presentation slide, then the method may automatically change the position, size, and/or orientation of one or more objects such that they no longer occlude one another or are occluded by the presenter's eye, thereby improving the effectiveness and utility of the multi-layer display;

As part of the processing of an object based on its type or category (or as an additional processing step), an object may be made selectable or activate-able by a user or machine to enable a user or machine to cause an operation to be performed on an object (such as to move or re-position it) or to execute an operation associated with the object (such as to initiate a payment processing or document retrieval operation);

Examples of such executable operations include but are not limited to:

Initiation of a payment transaction;

Activation of a link, resulting in accessing a data storage location or website;

Retrieval of data or a document from a specified storage location (such as a file, folder, etc.);

Transfer of data or a document to a desired location or user; or

Launching of a specific application; or

Generating a message;

Similarly, in some cases, an object may be made not selectable by a user or machine;

As part of the processing of an object based on its type or category (or as an additional processing step), an evaluation of whether an object in a first layer is obscured by (or is obscuring) an object in a second layer may be performed with the result of the evaluation used as an input to the processing of the object based on type or category (or as a separate operation) to reduce or remove the obscuration or overlap;

As part of the processing of an object based on its type or category (or as an additional processing step), an evaluation of whether an object in a first layer is likely to visually overlap or occlude an object in a second layer may be performed with the result of the evaluation used as an input to the processing of the object based on type or category (or as a separate operation) to reduce or remove the likelihood or degree of a possible overlap of one object by another;

In some embodiments, this may include determining the likelihood of obscuration or occlusion based on a user's gaze, angle of view, etc.;

In some embodiments, this may include determining that a possible overlap or occlusion would be viewed by a user because of the user's position, orientation, motion, gaze, or other aspect;

In some embodiments, the method may dynamically adjust both visual attributes (color, brightness, contrast, etc.) and position, size, or orientation of a detected object.

In some embodiments, the described adjustments may be performed one-time. In some embodiments, the adjustments may be performed continuously and substantially in real time. In some embodiments, the method's rules, models, or algorithms may be intended to determine an adjustment approach most likely to improve the recognizability of and interaction with a set of objects, thereby maximizing the effectiveness of communication and understanding of content. In this context, "maximizing communication" refers to adjusting characteristics or positions of objects to overcome or compensate for one or more of "limitations of view" and "limitations of intent" as those concerns are described herein.

In some embodiments, processing techniques may be used that automatically adjust a scene and include tools or user interface elements to allow humans and/or computers to determine when and how to adjust the characteristics and/or position of objects.

In some embodiments, a method may adjust a layer's opacity on either a single pixel, an object, or an entire layer to maximize communication and understanding of content.

In one embodiment, the disclosure is directed to a system for multi-layer display that prevents the overlap or occlusion of an object in one layer of a multi-layer display by an object in a different layer of the multi-layer display. In one embodiment, this may include determining that an object in a first layer may be partially or fully obscured by an object in a different layer because of a viewer's position, gaze, orientation, motion, or action. The system may include a set of computer-executable instructions and an electronic processor or co-processors. When executed by the processor or co-processors, the instructions cause the processor or co-processors (or a device of which they are part) to perform a set of operations that implement an embodiment of the disclosed method or methods.

In one embodiment, the disclosure is directed to a set of computer-executable instructions, wherein when the set of instructions are executed by an electronic processor or co-processors, the processor or co-processors (or a device of which they are part) perform a set of operations that implement an embodiment of the disclosed method or methods.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

In some displays to which the disclosed approach may be applied, objects and text may be displayed to a user in different layers of an overall display. In such a multi-layer display, a first layer may display one set of objects or text from a first source and a second layer at least partially visible through the first layer may display a second set of objects or text from a second source. Such a multi-layered display may enable a user or users to visually experience a sense of depth between objects and/or text, or to better interpret a set of objects as being part of a group. The objects or text presented in a layer may initially be determined and positioned independently of those in another layer, such as by a different application or source. The techniques and methods disclosed herein may be used to improve the recognizability of objects in the different layers and assist a viewer to interact with the objects more effectively, thereby improving the understanding of the presented content.

The system and methods described in one or more U.S. Patent Applications assigned to the assignee of the present application introduce a mode of combining visual content wherein multiple layers of objects may overlap. This capability may create additional issues that require addressing to assist users. For example, an object (or text) in one layer of a composite display of layers based on different sources may partially or completely obscure an object in another layer, either as originally positioned or after selection and movement by a user. It is also possible that an object (or text) in one layer may be caused to move by a user or an application and in doing so, appear to obscure or occlude an object or text in another layer. In either situation, a user or computing device may become confused and unable to accomplish a task or perform a function they were planning to perform.

It is noted that this "problem" exists because of the underlying systems and methods used to generate a multi-layer display. Conventional displays and display methods do not layer content from video frame buffers on top of one another, and instead place them either side-by-side, picture-in-picture, or present them one-at-a-time. However, the systems and methods used in implementing embodiments of the disclosure make it possible to display multiple content sources simultaneously on the same full screen. In contrast, conventional approaches require a user to choose to view someone's webcam feed or their presentation slide during a video-conferencing meeting. The ability to view multiple sources of video content at the same time and in a full screen mode may cause the new and previously not encountered issues or concerns that are addressed by the present disclosure.

When viewing digital content on a display which is a composite of one or more digital graphics sources (e.g., one or more "video feeds," and in some situations further combined with various windows of a running desktop or mobile-device application), the visual complexity or busyness of the composite may make it difficult for a human or machine to clearly recognize, interpret, and interact with displayed objects or content. As an example, in a composite video of a person's webcam combined/overlaid with a slide presentation, bold shapes on a slide may visually "clash" with the person's face from the webcam feed, making it difficult for another human or computer to understand the intended meaning of the composite communication.

As another example, consider a math teacher presenting a virtual lecture, with her face from a webcam feed overlaid with a virtual "blackboard" where she is writing, solving, and explaining equations. In this situation, visual distractions (such as glare from a background lamp) in the webcam feed may make it difficult for students to clearly see the equations. These and similar scenarios are examples of where composite video graphics may interact and/or obscure each other in unintended ways, thereby limiting effective communication and understanding of content.

In addition to the previous descriptions of problems that may arise when using multi-layer displays (which focused on what may be termed "limitations of view"), there may also be problems or difficulties arising from "limitations of intent." When there are multiple objects from multiple sources combined and presented together in an overall display, a human or computer may not be able to effectively select one or more such objects. As an example, if in a display of a presentation slide combined with a presenter's webcam feed, the presenter intends to select an object on the slide, the computer system may incorrectly interpret the action as selecting the presenter's eye, which may be fully or partially occluding the intended object on the slide.

Another problem in effectively interacting with a multi-layer display arises where the "viewer" is a computer (or process, or other form of device) and the computer is attempting to detect and interpret a visual object. In most of the applications of "computer vision," the techniques are applied to single (i.e., non-composite) video feeds, such as a camera feed from a turnpike station where a computer vision algorithm is attempting to find and interpret a vehicle license plate. In the more complex scenario of a display formed from a composite of sources, it is often difficult (if not unrealistic or infeasible) for a computer algorithm to correctly detect and interpret visual objects, particularly when visual objects from one or more of the "layers" partially or completely occlude one another.

FIG. 1 is a diagram illustrating a typical display generated by a conventional process for a video conference or similar application. As shown in the figure, an overall display 100 may comprise a single source of content (such as a live webcam video stream of a presenter or a screen shared by the presenter) presented as the primary display 102, with other sources presented as thumbnails 104 (such as other participants in a video conference) to the side of the primary display area.

As suggested by FIG. 1, conventional approaches divide the viewing area 100 into discrete sections and place different content into different sections. For example, on a video conference call the presenter's desktop/presentation may appear as the central "main window" 102 and their webcam feed (or that of other participants) may be presented as a smaller window 104 on another part of the screen. Similarly, some conventional approaches use a "picture-in-picture" approach whereby different sections of the screen are used to show different content.

In contrast, this disclosure is directed to an approach where multiple content sources are shown simultaneously on the same parts of the screen, using transparency/opacity adjustments and blending techniques to digitally merge content and enable users to distinguish objects. This has a benefit in that presenters and participants no longer need to choose which screen area to focus on, but instead can watch the whole screen and see all the content at once. Further, the content elements may be dynamically adjusted for transparency, opacity, size, position, color, contrast, resolution, and other properties to improve recognizability and thereby maximize clarity and understanding of content.

Figure 2:
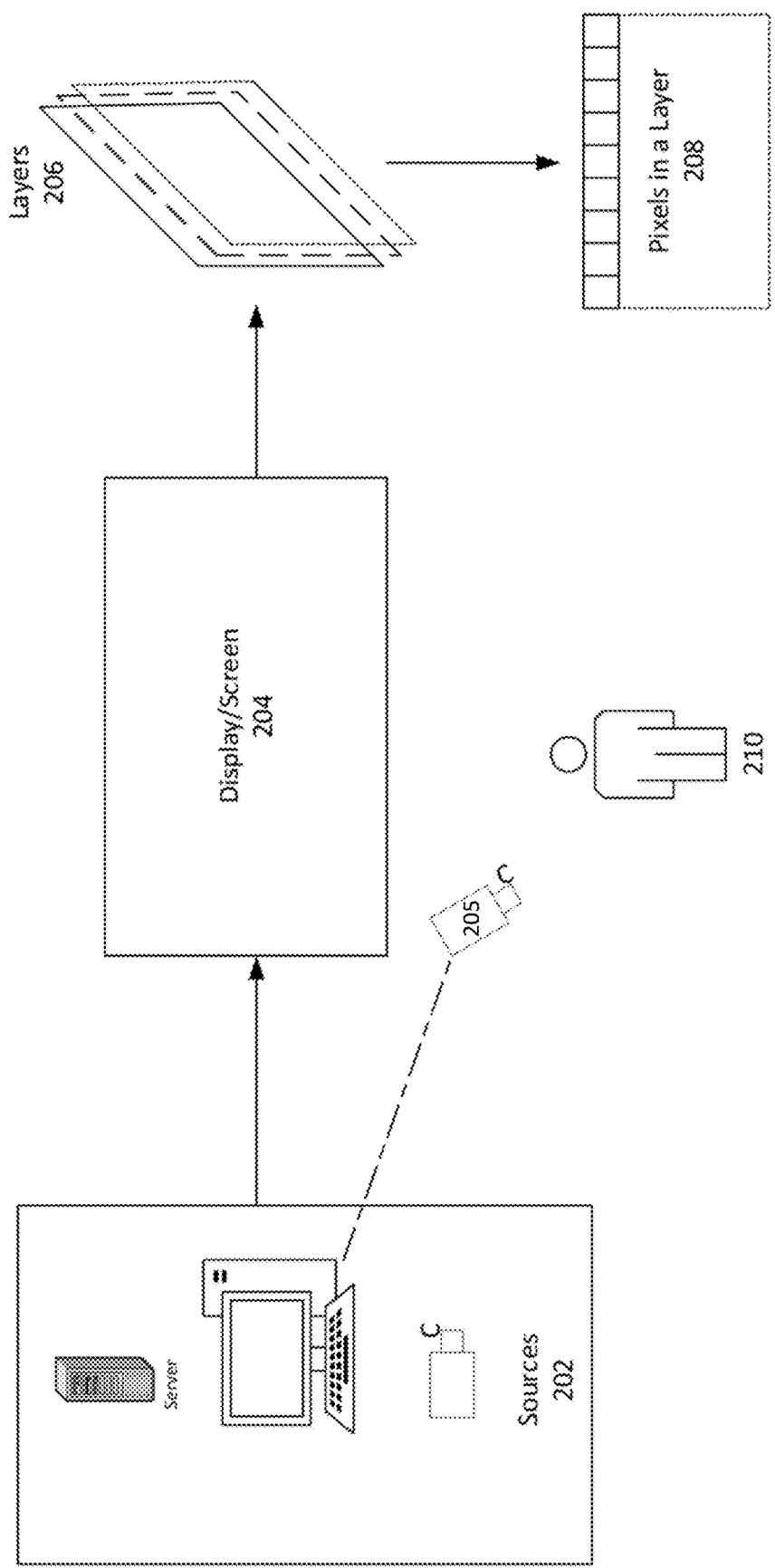
FIG. 2 is a diagram illustrating certain of the concepts involved in an embodiment of the disclosed system and methods.

FIG. 2 is a diagram illustrating certain of the concepts involved in an embodiment of the disclosed system and methods. As shown in the figure, content provided by a plurality of sources 202 may be combined or merged and displayed on a screen 204. Sources may include but are not limited to a server (local or remote), a video camera 205 connected to a user's desktop computer or mobile device and used to generate a video of the user 210, or a camera (C) connected to another device. The generated or merged display 204 may be presented on the user's device and/or a device of other users. As suggested by the figure, display 204 may be comprised of a plurality of layers 206, with each layer comprising a plurality of pixels 208, typically arranged in rows and columns. As described, in embodiments of the multi-layer display disclosed herein, each layer may represent content or objects from a different source and the layers are of substantially the same dimensions, for example a full screen.

A set of elements, components, and processes of the type shown in FIG. 2 may be used to enable users to view and interact with displayed objects and information. The interactions can be as part of a communication experience, a presentation, a gaming experience, an instructional or educational experience, the monitoring of an event or location, a tour of a venue, the delivery of a service, or other experience in which a person or machine views or interacts with a display and with objects in the display. The displayed information can be an image, text, video, a link to content, an object, a selectable user interface element, or other form of information or content. As suggested by the figure, in one example, the displayed information may be obtained from multiple sources 202, where the sources may include an end user's device, a remote server storing content, or a camera that is part of a device. The camera may be part of the end user's device or of another device.

In some embodiments, an object may be identified or classified in a layer of a display or a frame of a video buffer using a computer vision (CV) technique. Computer vision techniques typically rely on image processing algorithms that may first reduce the "color depth" of images and video streams, without a loss of important content or aspects of an item of content. For example, an object that is an image of a flower will still be recognizable as a flower even if its color depth (palette) is reduced from a set of 16 million colors to 256 grayscale colors. This form of processing allows the application of a trained model, such as a convolutional neural network (CNN) or other form of classifier to detect and classify objects in an image. The reduced color palette produces a significant improvement in the performance of a CNN so that when processing real-time video, the frames-per-second (FPS) rate can be kept sufficiently high enough, and hence feasible to use in a greater number of situations.

In some embodiments, a memory may be accessed and examined to identify operations being executed by a computing device. Examples may include finding an operating system (OS) window/application by calling the OS application programming interfaces (APIs) to get a list of all windows, their position, and their size, using the OS APIs to track where a user is moving the mouse, or finding objects in webpages by inspecting the HTML data that defines what a browser renders on a screen.

Once an object comprising a set of pixels is identified, the contents or appearance of individual pixels or a set of pixels may be adjusted or altered with regards to color, shadow, contrast, opacity, size, shape, resolution, or another characteristic. Together, a set of pixels may form a shape, text, object, or other characters. Each source of pixels (e.g., an executed application, a camera, a video frame buffer, a video feed from an external source) provides content that is "merged" into a single video/graphic display, with the result being displayed on a full screen by the operating system. In real-time and dynamically, as the sources are merged, a system of the type suggested by FIG. 2 can adjust the relative transparency, opacity, amount of occlusion, or select-ability of an object, pixel, or set of pixels. This provides the ability to display a set of objects, images, video, etc. as a distinct layer of a multi-layer display, with some objects varying in transparency, opacity, or other characteristic with respect to objects in other layers.

As suggested, the display on a monitor of the end user's device may be generated in a manner to include multiple distinct layers, where each layer is comprised of a plurality of pixels and each layer represents content obtained from one or more of an application, document, camera, other device, etc. The pixels in each layer may be adjusted with regards to their transparency, opacity, or other characteristic independently of other pixels in that layer or pixels in other layers. This permits elements or components of one layer to be viewed through other, overlying layers.

For example, one set of objects, text, or other elements may be presented in a layer that is visible through an overlying layer that appears to be placed on top of it. This may be accomplished by adjusting the pixels in the upper or overlying layer so that they are at least partially transparent and permit viewing of certain of the pixels in the lower or underlying layer. The ability to adjust the relative transparency (or viewability) of the pixels in one layer relative to another layer permits a user to select and interact with multiple layers (and hence multiple sources) of content.

As mentioned, in one embodiment, a layer of the display may be generated by accessing a video frame buffer of the end user's computing device (such as a tablet, laptop, desktop, or smartphone). The accessed data may include an object or element, where the object or element may provide a mechanism for accessing content to be integrated with a layer or layers of the multi-layer display generated by the end user's device. The mechanism may be a recognizable shape or form and may include an identifier, code, or metadata that may be used to access information, data, or content. The identifier, code, or metadata may direct the end user's device to a remote server, a database, or to information stored on the end user's device. The accessed information, data, or content may include both content and information that determines how to display that content.

In some embodiments, data captured by a camera (such as an image of a user) may be subject to image processing and analysis to recognize and identify objects or gestures, or to detect and evaluate motion (e.g., a user's gaze or a user's or object's position changes, acceleration, orientation, etc.). In response, an application or process may alter what is displayed in one or more layers of the overall multi-layer display viewed by a user or a camera. For example, a camera may capture a user making a gesture, and in response a layer of the display may be altered to show the selection of a user interface element.

In another example, the perspective, position, or orientation of an object or element displayed in a layer may be altered as a user turns their head. This may be based on tracking the position and orientation of the user's head or eyes and using that to alter the way in which a source's content is presented. In a related capability, because the characteristics of a pixel (and hence an object) may be varied from its source characteristics before it is presented in a layer of a multi-layer display, the appearance of depth or shadowing may be added or varied. This provides an ability to alter the apparent significance of an object to a user and increase the likelihood it will be noticed or selected by a user or machine-implemented process.

As examples, a user may be enabled to interact with objects or user interface elements displayed in one or more layers of a screen display on a monitor by using gestures, their positioning, their orientation, or their motion that is detected and captured by a video camera. The interactions may be used to control a computing device or presentation of an experience (e.g., a game, lecture, etc.). This may be accomplished without the user's direct contact with the computing device. Further, a user may introduce an object from their environment into a layer of the display (via a camera capturing an image of the object) and then interact with it as part of what is displayed on the screen or monitor. Embodiments may provide these functions and capabilities through real-time tracking and recognition of a user's hand and fingers, and presentation of that information as a layer of a display. Recognition of when a user's finger overlays a user interface element in a different layer of a display may be followed by selecting or activating the user interface element.

As disclosed herein, to assist in correctly and unambiguously determining a user's intent when they select or interact with a displayed object, a system may incorporate logic to identify an existing or potential overlap or occlusion of one object by another. A potential overlap or occlusion may occur when an object in one layer is being moved or may appear to a user to move due to the user's motion, gaze, orientation, etc. In response, the system may prevent or reduce the actual or potential obscuration of one object by another by automatically varying a position, orientation, size, shape, transparency, or resolution of an object. As part of this processing (or independently of it), embodiments may alter pixel characteristics to enhance the ability of a user or machine to select a user interface element, object, text box, or other feature.

As mentioned, in some embodiments, one or more of the disclosed functions and capabilities may be used to enable a form of "touchless computing" wherein a user's gaze, gestures, movements, position, orientation, or other characteristics observed by a camera are used as the basis for selecting objects and executing processes on a computing device. Further, because the opacity of pixels in different layers may be adjusted to improve viewing and recognizability of objects in one or more of the displayed layers of a multi-layer display, this may also be considered a form of "transparent computing." This type of computing experience may include the presentation of a plurality of objects or content distributed among multiple layers. Transparent computing may also include the ability of a user to interact with a 3-dimensional environment, for example by introducing an image of an object into a layer and interacting with the object as part of performing a task.

In some embodiments, the presence or absence of an object, person, or an attribute of a person or location (e.g., wallpaper, a poster, a scene, a well-known structure, etc.) may be determined by image processing or accessing a video buffer, and that information used as part of an authentication, access control, or other security-related function. In a related example, a camera connected to one computing device may detect and/or identify an object displayed on a screen of another computing device, and that detection and/or identification may be used as part of an authentication or access control process.

In some embodiments, image processing techniques may be used to determine the separation or orientation between a person or object and a camera. This separation or orientation may be used as part of a logical process to decide whether to initiate an authentication or other security process. For example, as a person or object nears a display screen, the distance may be determined and compared to a threshold value. The result of the comparison may then be used to initiate a request for authentication.

Sharing of the same (or substantially the same) screen space by multiple layers of a multi-layer display effectively introduces another dimension into the processing of video data. Conventionally, video processing is based on a two-dimensional array of pixels, expressed in (x, y) coordinates. In contrast, the present disclosure introduces an approach for use with a three-dimensional array of pixels, expressed in (x, y, z) coordinates, where the color, brightness, contrast, transparency, opacity, and/or resolution of each pixel may be individually adjusted in real-time.

Figure 3:
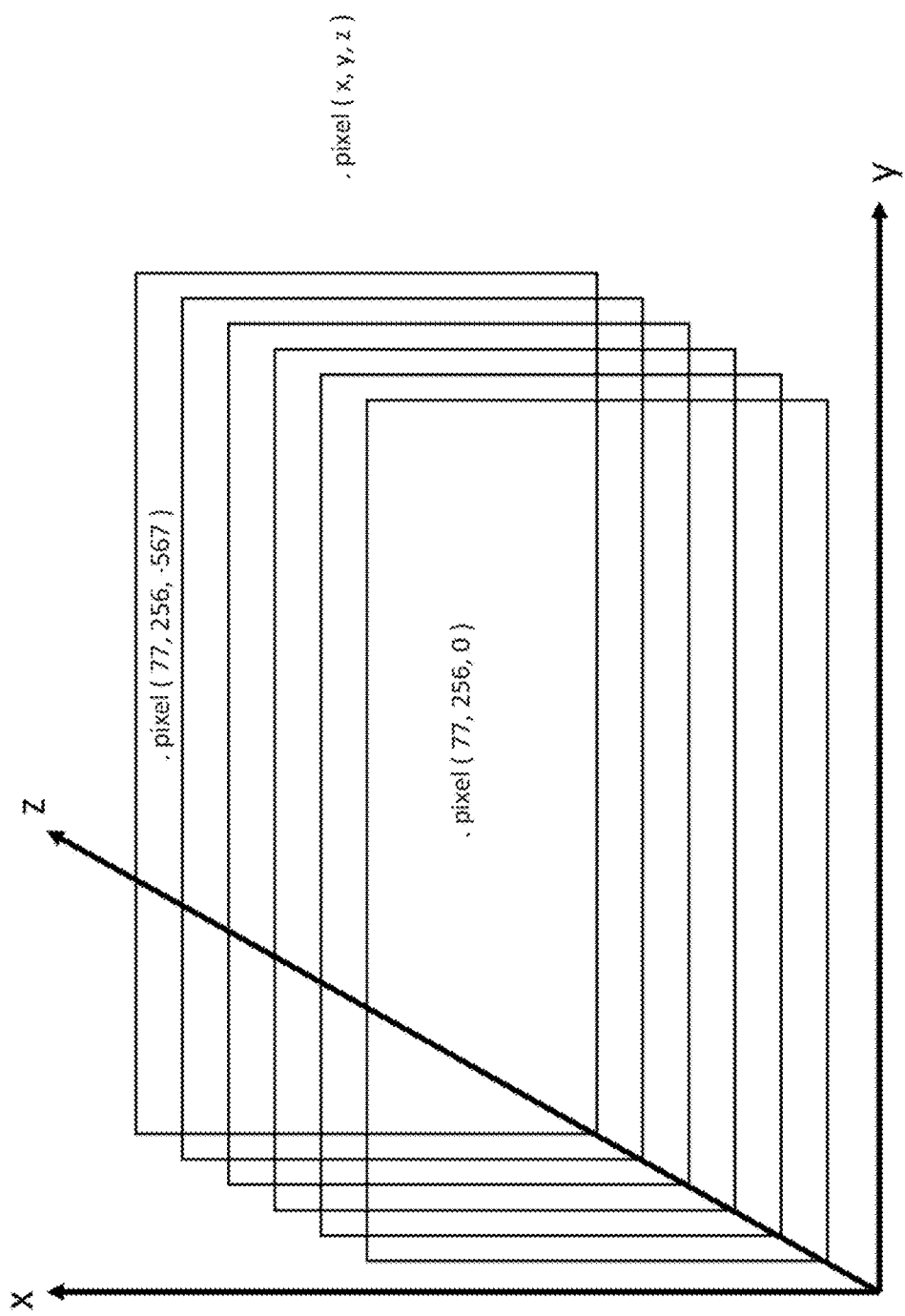
FIG. 3 is a diagram illustrating how a pixel in a layer of a multiple layer display may be "defined" by or associated with a three-dimensional coordinate system.

FIG. 3 is a diagram illustrating how a pixel in a layer of a multiple layer display may be "defined" by or associated with a three-dimensional coordinate system. As shown in the figure, a pixel in a first layer may have coordinates (77, 256, 0) in a (x, y, z) coordinate system, while a pixel in a second layer may have coordinates (77, 256, −567) in (x, y, z) coordinates. In such an example, the pixel in the first or top layer may obscure the pixel in the lower layer. However, by adjusting the appearance of the two pixels, it is possible to enable a user to view the lower-level pixel through the top layer pixel without removing either pixel from the display.

Figure 4:
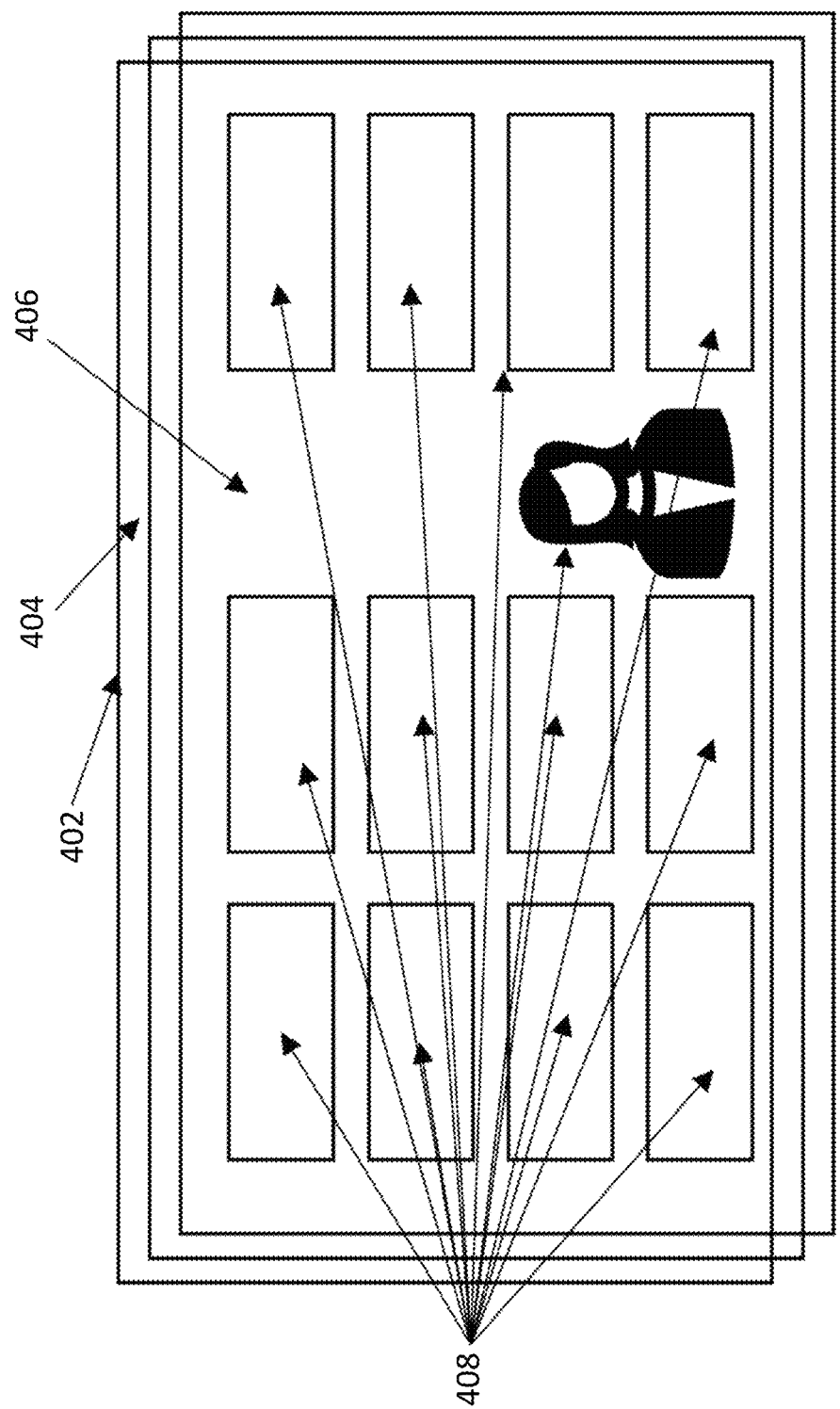
FIG. 4 is a diagram illustrating an example of a display screen (such as the display of a computing device) on which are generated and displayed multiple overlapping layers, in accordance with some embodiments.

FIG. 4 is a diagram illustrating an example of a display screen 402 (such as the display of a computing device) on which are generated and displayed multiple overlapping layers 404 and 406, in accordance with some embodiments. As a non-limiting example, layer 404 may be generated from content acquired from a source, and layer 406 may represent a feed from a video web camera. Each of layers 404 and 406 may contain one or more visual objects 408, where objects 408 may include one or more of document or video thumbnails, a live speaker's webcam video, recorded images/videos, or web content, as examples.

As mentioned, in some embodiments, a sub-system or process may be used to detect an actual or possible situation in which an object in one layer overlaps or obscures an object in another layer, and in response and minimize or eliminate the overlap or obscuration. The overlap or obscuration may occur due to an initial arrangement of objects in different layers, and/or may result from a change in position of an object, a change in how a user views a display (e.g., from directly in front or from the side, or with their eyes facing the display or with their head turned), or other factor. In some embodiments, the sub-system functions to enable visual objects to automatically and dynamically be made "aware" of each other to avoid potential overlaps or obscurations. In this regard, embodiments of the disclosure introduce techniques to alter the appearance of objects within and across displayed layers, either automatically or by human control.

In some embodiments, the automatic object appearance adjustments are based on determining the type and context of objects. Here the context includes the objects themselves (i.e., is the object a human hand making a specific gesture) and/or the ambient context, such as time-of-day, location, or changes in environmental conditions within a video feed. Such environmental changes may include a light being turned on so that objects are lighter, or reflections become more prominent. Object changes may also include human-induced appearance adjustments based on a one or more of real-time tracking of a human gaze direction (i.e., where in a layer a person is looking), or the human's position and movement relative to the objects within the layers.

As described, the disclosed approach and techniques may be used to detect and group pixels into "objects" and to detect, measure, and track the movement, direction, orientation, rotation, and velocity of these "objects" in real time. A trained convolutional neural network (CNN) may be used to detect and classify objects within images and/or live video streams. A sub-system or process may be used to detect an actual or possible situation in which an object in one layer overlaps or obscures an object in another layer (or may appear to), and in response minimize or eliminate the actual or potential overlap or obscuration.

In one embodiment, the sub-system may operate to detect objects and assign a geometric boundary around objects in a three-dimensional space, and monitor events to determine when one or more objects have overlapping geometry coordinates. Further, "intelligent" algorithms or decision processes may be used to implement predictive approaches (such as, but not limited to stochastic, Bayesian and/or regression techniques) to predict a likelihood of two objects overlapping or appearing to overlap.

Figure 5:
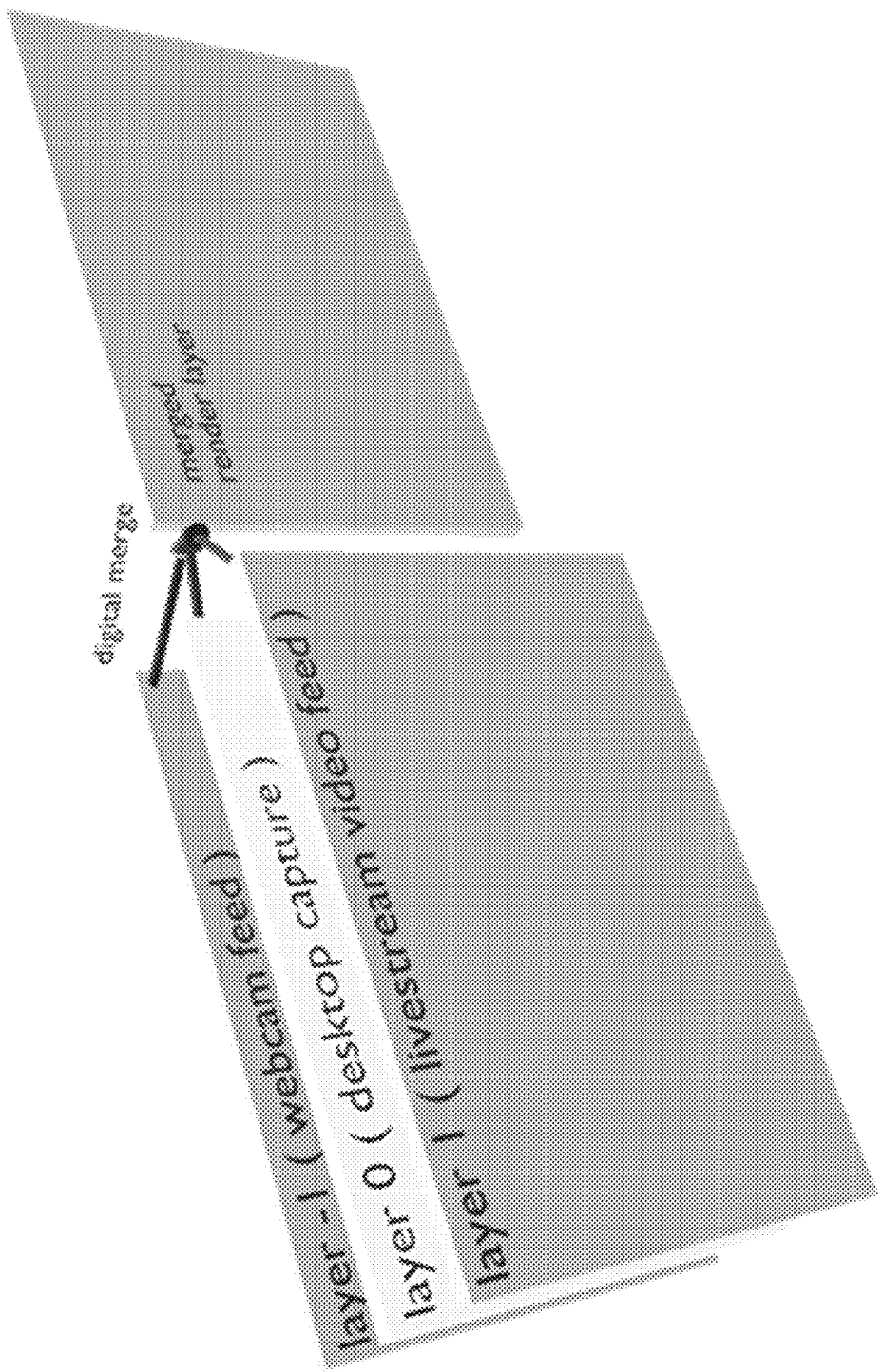
FIG. 5 is a diagram illustrating an example of multiple video sources being combined or merged to form a multi-layer display; in this example, Layer 0 is a capture of a computer desktop, Layer −1 is a capture of a webcam video feed, and Layer 1 is a capture of a live video streaming feed.

FIG. 5 is a diagram illustrating an example of multiple video sources being combined or merged to form a multi-layer display; in this example, Layer 0 is a capture of a computer desktop, Layer −1 is a capture of a webcam video feed, and Layer 1 is a capture of a live video streaming feed. Each layer is digitally analyzed, frame-by-frame, pixel-by-pixel, in real-time and an optimized combination of the aggregate pixels is digitally merged into a composite video stream. Note that this is one example of a situation where composite video graphics may interact and/or obscure each other in unintended ways, thereby limiting effective communication and interactions with the displayed elements of the sources.

As mentioned, in some embodiments, a first step in implementing the disclosed object processing is the computer detection of one or more objects or elements within each layer of a multi-layer display (i.e., in one or more of the composite graphics feeds used to produce the multi-layer display). One or more techniques from the field of Computer Vision may be used to detect and identify/classify an object using a convolutional neural network (CNN), a trained machine learning (ML) model, and/or parsing of digital metadata embedded within video feeds. One or more CNNs or models may be trained to detect and identify visual elements such as edges, corners, shapes, numbers, etc. More complex (deeper) models may be trained to detect specific visual elements, such as hands, eyes, birds, etc.

Once the objects (e.g., images or text) in each layer of a multi-layer or composite feed have been detected, an embodiment of the method may determine the object type, category, or classification using a suitable technique. The determined type, category, or classification may be one of, but is not limited to "alphabetic text," "geometric shape," (e.g., square, circle, or oval) "window of an open, executing application," "human hand, face, or body," as examples. Determination of the type, category, or classification may be performed by a trained machine learning model, a rule-set, inspection of a log file or operating system status, or other suitable technique that is applicable to the type or category of object.

In some embodiments, the following techniques may be used to detect and/or identify objects, and as part of determining how an object is to be processed:

Convolutional Neural Network (CNN) based models acting as classifiers—CNN and similar neural network-based models can be trained to identify types of visual objects, such as shapes (rectangles, circles/ovals, triangles, etc.), or common shape types (e.g., dog, cat, plant);

As examples, in one embodiment, the types of objects that a CNN has been trained to identify/classify include humans (including a full body pose, just a face, just a hand or pair of hands, just eyes, or a combination thereof), text appearing on a layer, and primitive shapes (including understanding the context in which an identified shape is used (e.g., is a rectangle a web advertisement, or a data table in a power point presentation?));

Geometric-based models to determine if an object in one layer is obscuring an object in another layer—for example, a geometric model may place a 2-dimensional or a 3-dimensional boundary area around an object (e.g., a spherical shape around a basketball, an ovaloid shape around a football, a rectangular shape around a web advertisement, etc.) and use those boundaries to determine the possible obscuration of one object by another;

Geometric-based models to determine a likelihood of an actual or apparent overlap, occlusion, or obscuration between an object in one layer and an object in another layer—this may occur as a result of the motion of one object relative to another, and/or a change in the apparent relative positions of objects in different layers due to a movement or selection of an object, or the perspective of a viewer. For example, in some embodiments, the defined boundary areas may be monitored to determine a possible intersection or overlap of the boundary area of one object with a boundary area of one or more other objects in the same or different layers;

Models based on the behavior of objects in motion (such as by incorporation of principles/law of physics) may be applied in some cases;

for example, to cause objects that may overlap to react or "repel" each other in a realistic manner (e.g., objects with greater mass may intersect with greater momentum and energy and result in the objects appearing to be repelled with greater momentum in the resulting directions);

Models may also be developed to avoid overlap by automatically moving objects "around" each other through adjustments in position, orientation, motion, etc.;

As suggested, even if not overlapping when viewed directly, two objects may appear to overlap or have the potential to overlap due to the viewer's perspective—thus, as a viewer moves or changes their gaze, two objects that were recognizable may become less so; and NLP (natural language processing) and NLU (natural language understanding) models may be used to recognize and interpret text;

For example, a combination of optical character recognition (OCR) and NLP may be used to detect what language or words a group of text characters represent, and this used with NLU to infer the intended meaning of words and reduce possible ambiguities.

In some embodiments, the method then determines (e.g., based on a rule-set, formula, or trained machine learning model) how to further process the identified objects, typically based on the object type or category. For example, if a human profile is detected, then the method may extract the human profile from the remainder of a web cam video feed (i.e., background subtraction) and replicate it digitally. A reason for the digital replication might be to re-insert one or more of the replications back into the composite feed, with an adjustment to color, brightness, contrast, size, resolution, etc.

In one embodiment, a set of rules for determining the subsequent processing of an object or text may be based on a list of object types of interest, where the list may be manually curated by a human. Compilation of such a list may be followed by using a machine-learning algorithm to create a trained model to automatically recognize each of the object types of interest in a video frame buffer or image generated from a video stream. Such models include but are not limited to the use of convolutional neural networks as classifiers, for example.

As an example, in one embodiment, an initial list of object types of interest might include humans (e.g., full body, or specific body parts such as eyes, head, nose, etc.), numbers, text, primitive shapes (e.g., squares, circles, etc.), or mobile phones. For each object type or category, a model may be trained to automatically recognize the object type or class under a variety of image or video conditions (e.g., low/high contrast, low/high quality, low/high background lighting, etc.).

For each object that is of a type of interest, one or more rules may be applied based on the type. For example, if the object type is "text," an embodiment may implement a rule that acts to translate the visual text into a data equivalent of the text, followed by interpreting the text (using a process or processes such as object character recognition (OCR), natural language processing (NLP), or natural language understanding (NLU)). This processing may be followed by applying a subsequent rule to block or blur the text to protect data privacy or to automatically translate the text into an alternate language and present that to a viewer.

As another example, adjustments or additional processing of image or pixel characteristics may be performed to address the previously described "limitation of view." An example is to modify a human profile so that it is no longer "lost" in the "visual busyness" of a composite graphic but instead is more clearly distinguishable in the "scene". This is expected to result in improving communication and understanding of the displayed content.

Similarly, the disclosed method may detect that a visual object is alphabetic text and may re-introduce one or more digital copies of the text back into the composite display, with adjustments for color, brightness, contrast, size, or position so that the text is more readily recognized by viewers of the display. This may provide a solution for a scenario where light from a lamp in the background of a web feed makes it difficult for viewers to see content presented on a blackboard or surface.

In some embodiments, the processing disclosed may change or alter the visual attributes of one or more objects (such as color, brightness, contrast, or resolution) but may also automatically move the position, size, and/or orientation of one or more of the objects. As an example, in a situation where a detected object in one layer is fully or partially occluding one or more objects on a presentation slide in another layer, the method may automatically change the position, size, and/or orientation of one or more of the objects so that they no longer occlude one another, thereby improving the communication and effectiveness of the presented content. In some embodiments, the method may simultaneously and dynamically adjust both visual attributes (e.g., color, brightness, contrast, or resolution) and position, size, or orientation of an object or objects in one or more layers.

As described, embodiments are directed to systems, devices, and methods for a multi-layer display that prevents or reduces the apparent or potential overlap or obscuration (either partially or completely) of an object in one layer by an object in another layer of the display. The adjustments may be one-time or continuous and ongoing, and the method's techniques may determine an adjustment approach that will improve recognizability of the objects, and thereby maximize effective communication and understanding of the content.

Further, in addition to utilizing techniques that automatically adjust a set of objects or other forms of content, embodiments allow humans and/or computing devices to determine when and how to adjust the appearance, position, attributes, orientation, or other characteristics of objects. As examples, the color and contrast of text may be altered dynamically to make it stand out more clearly from the background, or the position of a video-playback element may be moved to prevent it from overlapping or being overlapped by other parts of an aggregate video.

In some embodiments, the disclosed method may adjust the opacity (or relative transparency) of one or more pixels, objects, or regions of each layer (at a single or multiple pixel granularity) to improve the recognizability of an object and thereby maximize effective communication and understanding of content. In the situation where a detected visual object is alphabetic text, the method's techniques may apply object character recognition (OCR) to dynamically translate the "raster" representation of the text to binary encoded representations (e.g., ASCII byte values).

Further, in the case where objects are OCR-translated alphabetic text, the method may automatically translate the text into one or more different human languages so that each viewer views the text in a language they select. In this example, the OCR-translated alphabetic text may be processed by a language translation library (such as Google's Translate API or similar) into the language that each viewer has selected in their settings or profile.

A novel aspect of the disclosure is replacing the original text in video images or streams with one or more different languages (specific to each participant) in real-time. Conventional approaches are not believed capable of translating text into multiple languages while simultaneously hiding/obscuring the original text from sight. This capability enables converting existing text in a live video or presentation into multiple languages in real-time so that each participant's display presents the content in a language of their choosing.

In a situation in which an object is replicated, the disclosed method may dynamically remove the original source object from the composite graphic. As an example, in the case where digital replicas are being dynamically moved (with regards to position, size, and/or orientation), if the original object were to remain in place, then the desired net effect of movement may not be achieved because viewers would still see the original version of the object.

With respect to providing a solution to the previously described "limitation of intent" problem, the method's techniques may dynamically control the ability to select an object or user interface element in one or more of the composite layers. As one example of this capability, in a scenario of two composite video feed layers, the method may make one of the layers ignore mouse-clicks for one or more of that layer's pixels or objects. In the example of a presenter intending to select an object on a slide that happens to be partially occluded by another object in a different layer, the method may make the pixels that comprise one object ignore a mouse click (or other form of selection), allowing the click "action" to flow through that layer to the intended layer and select the desired object.

Similarly to the logic used to determine how to process a specific type of object, the logical processing that determines whether to enable the selectability of an object may be implemented in the form of a trained model or rule-based system. In one example, a rule-based system may start with basic use-cases, such as if a detected object is associated with a well-understood (or unambiguous) purpose. An example would be a "play" button or a shopping cart button, in which case the system may implement logic that makes those objects selectable/clickable, regardless of which layer they reside in.

Figure 6:
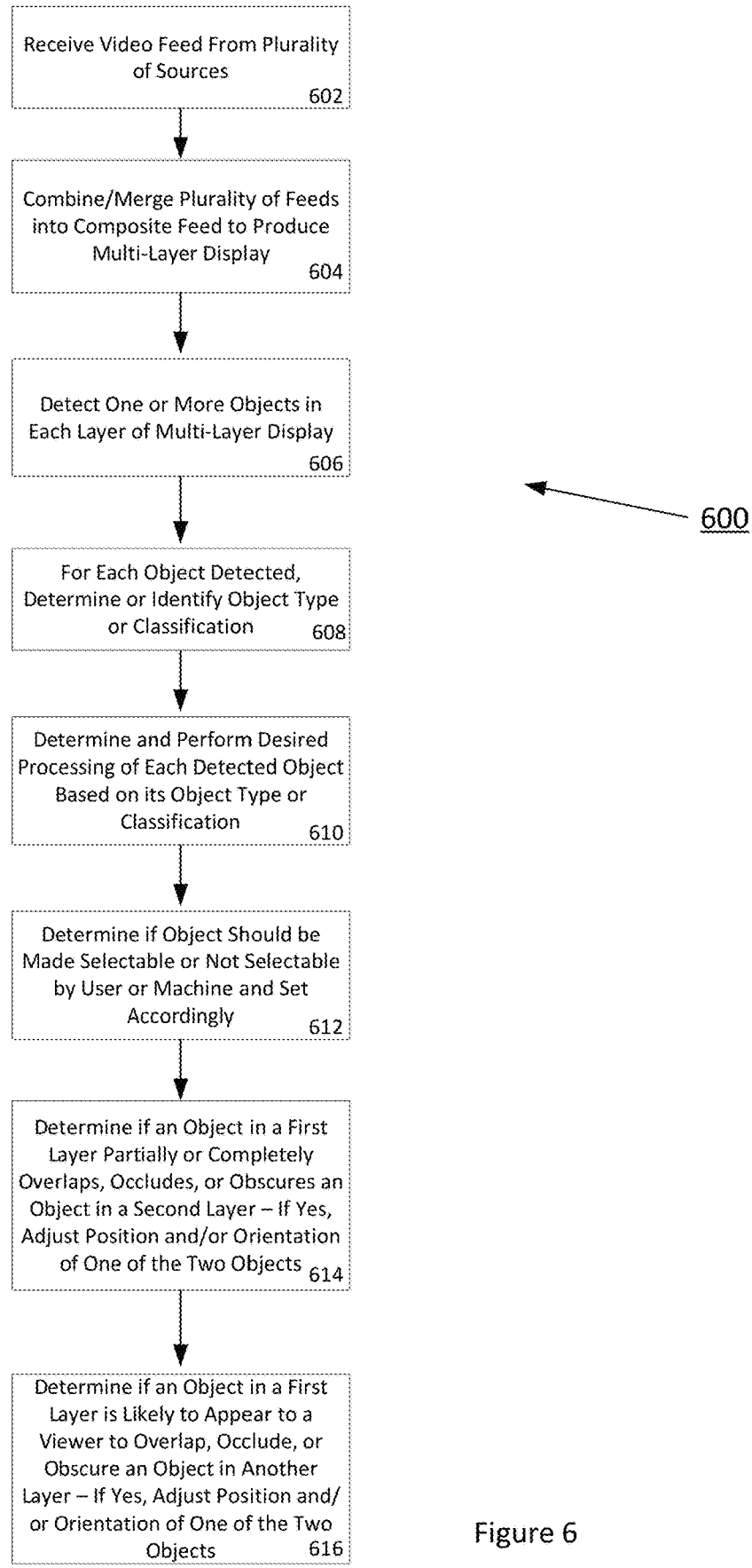
FIG. 6 is a flow chart or flow diagram illustrating a method, process, operation, or set of functions that may be used in implementing an embodiment of the disclosure.

FIG. 6 is a flow chart or flow diagram illustrating a method, process, operation, or set of functions that may be used in implementing an embodiment of the disclosure. In some embodiments, the set of steps or stages illustrated in the figure may be performed by execution of a set of computer-executable instructions by one or more electronic processors. The electronic processor(s) may be part of a system, device, platform, server, etc. Each step or stage illustrated may be performed by execution of instructions by one or more of the processors.

In some embodiments, a set of trained models or rule-sets are provided to an end-user and may be included as part of an application or operating system function they install on their client device. In one embodiment, the formation of the display comprising the merged sources of content is performed by the application or function, as is the processing of pixels and objects (apart from the training or construction of the models).

As shown in the figure, the method, process, operation, or set of functions 600 may include, but is not limited to or required to include:

Receiving a Video Feed From a Plurality of Sources (as suggested by step or stage 602);
  As described, the sources may be one or more of a camera feed, computer desktop, document presented in an operating system window, or streaming video as non-limiting examples;

Combine/Merge the Plurality of Feeds into a Composite Feed to Produce a Multi-Layer Display (as suggested by step or stage 604);
  A composite feed is formed from combining the pixels from each source of content into a multi-layer display;
    In some embodiments, each source may be used to generate one layer of a multi-layer display;
  The source content processing operations and logic may be performed to cause pixels from different sources to be merged into a single display in which each of the sources appear as a different layer or region, or in which objects from different sources are combined into a layer;

Detect One or More Objects in Each Layer of a Multi-Layer Display (as suggested by step or stage 606);
  This operation or function may be performed by a suitable image processing technique, such as those used for computer vision or object recognition (e.g., a convolutional neural network, box or edge detection, etc.);
  The computer vision or object recognition technique may be applied to the generated display, to a video frame buffer, or to other aspect of the system;

For Each Object Detected, Determine or Identify an Object Type or Classification (as suggested by step or stage 608);
  As described, this may be performed by a trained model operating to identify/classify an object, a rule-set that operates to define characteristics of an object, etc.;

Determine and Perform Desired Processing of Each Detected Object Based on its Object Type or Classification (as suggested by step or stage 610);
  A set of rules or instructions may be accessed that defines how each object type or classification should be treated;
    The rules or instructions may be generated by a user, based on a set of guiding principles for improving object recognizability or more effective communication, a fuzzy logic system, a system that learns from a set of images and instructions for how to improve the images, or other suitable technique;

Determine if an Object Should be Made Selectable or Not Selectable by a User or Machine and Set Accordingly (as suggested by step or stage 612);
  This may be part of the accessed set of rules or instructions and/or be determined based on which objects or user interface elements are visible after performing the processing of each object;
  This determination and action may be optional, or delayed and performed at a later time in the processing flow;

Determine if an Object in a First Layer Partially or Completely Overlaps, Occludes, or Obscures an Object in a Second Layer—If Yes, Adjust Position and/or Orientation of One of the Two Objects (as suggested by step or stage 614);
  This may be part of the accessed set of rules or instructions and/or be determined based on which objects or user interface elements are partially or completely obscured after performing the processing of each object; and Determine if an Object in a First Layer is Likely to Appear to a Viewer to Overlap, Occlude, or Obscure an Object in Another Layer—If Yes, Adjust Position and/or Orientation of One of the Two Objects (as suggested by step or stage 616);

This may be part of the accessed set of rules or instructions and/or be determined based on which objects or user interface elements are likely to appear to overlap after performing the processing of each object;

As described, this apparent overlap, occlusion, or obscuration may result from motion of an object, execution of an operation by a device, or the viewer's position, orientation, or gaze, as examples;

One or more of steps or stages 606 through 616 may be performed continuously on each frame of a video or each set of content being merged into a multi-layer display.

Figure 7:
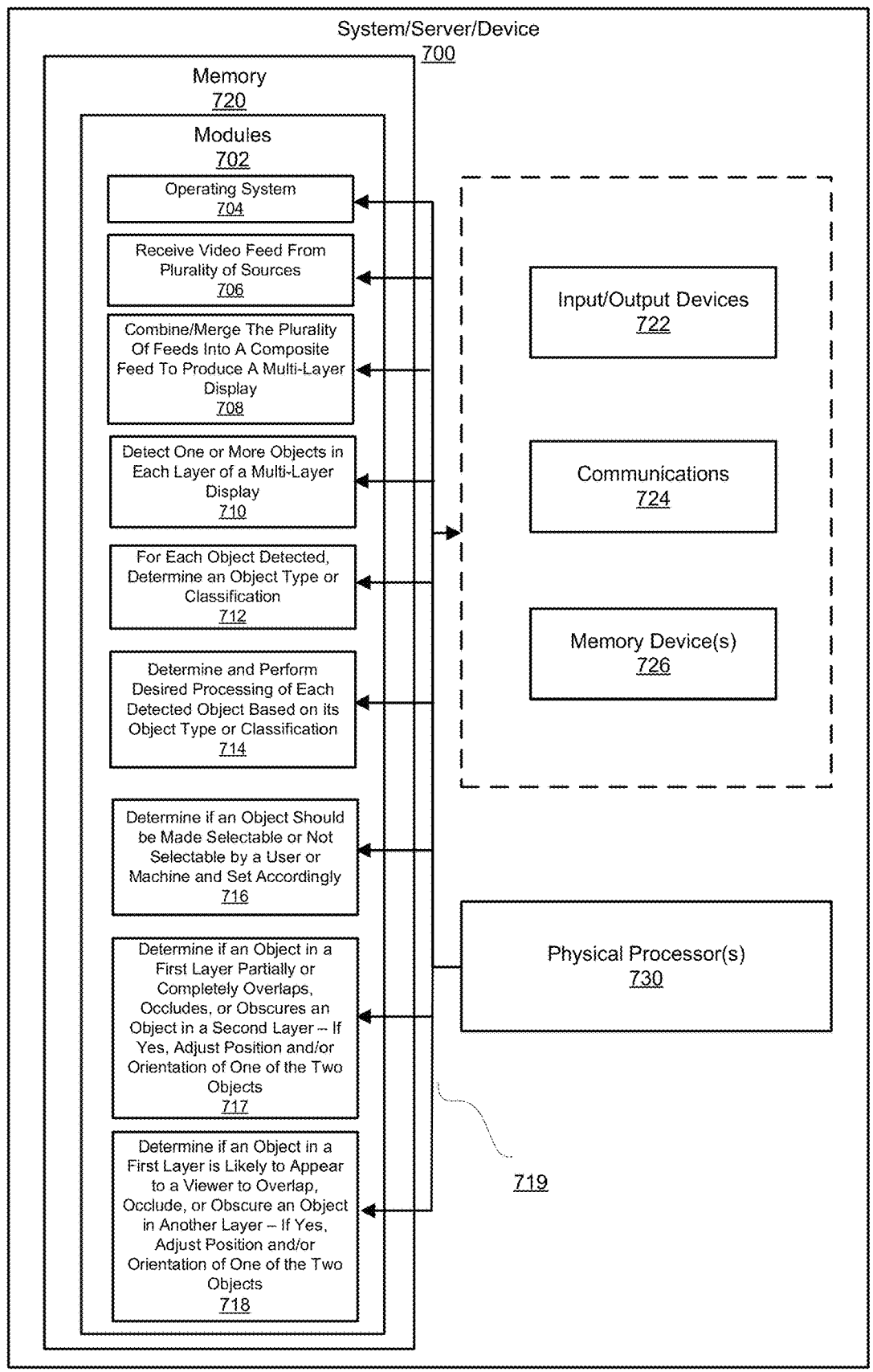
FIG. 7 is a diagram illustrating elements or components that may be present in a computer device or system configured to implement a method, process, function, or operation in accordance with an embodiment of the system and methods described herein.

FIG. 7 is a diagram illustrating elements or components that may be present in a computer device, server, or system 700 configured to implement a method, process, function, or operation in accordance with some embodiments. As noted, in some embodiments, the described system and methods may be implemented in the form of an apparatus that includes a processing element and a set of executable instructions. The executable instructions may be part of a software application and arranged into a software architecture.

In general, an embodiment of the invention may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As shown in FIG. 7, system 700 may represent a server or other form of computing or data processing device. Modules 702 each contain a set of executable instructions, where when the set of instructions is executed by a suitable electronic processor (such as that indicated in the figure by "Physical Processor(s) 730"), system (or server or device) 700 operates to perform a specific process, operation, function, or method. Modules 702 may contain one or more sets of instructions for performing a method or function described with reference to the Figures, and the descriptions of the functions and operations provided in the specification. These modules may include those illustrated but may also include a greater number or fewer number than those illustrated. Further, the modules and the set of computer-executable instructions that are contained in the modules may be executed (in whole or in part) by the same processor or by more than a single processor.

Modules 702 are stored in a memory 720, which typically includes an Operating System module 704 that contains instructions used (among other functions) to access and control the execution of the instructions contained in other modules. The modules 702 in memory 720 are accessed for purposes of transferring data and executing instructions by use of a "bus" or communications line 719, which also serves to permit processor(s) 730 to communicate with the modules for purposes of accessing and executing a set of instructions. Bus or communications line 719 also permits processor(s) 730 to interact with other elements of system 700, such as input or output devices 722, communications elements 724 for exchanging data and information with devices external to system 700, and additional memory devices 726.

Each application module or sub-module may correspond to a specific function, method, process, or operation that is implemented by the module or sub-module. Each module or sub-module may contain a set of computer-executable instructions that when executed by a programmed processor or processors cause the processor or processors (or a device or devices in which they are contained) to perform the specific function, method, process, or operation. Such function, method, process, or operation may include those used to implement one or more aspects of the disclosed system and methods, such as for:

Receiving a Video Feed From a Plurality of Sources (module 706);

Combine/Merge the Plurality of Feeds into a Composite Feed to Produce a Multi-Layer Display (module 708);

Detect One or More Objects in Each Layer of a Multi-Layer Display (module 710);

For Each Object Detected, Determine an Object Type or Classification (module 712);

Determine and Perform Desired Processing of Each Detected Object Based on its Object Type or Classification (module 714);

Determine if an Object Should be Made Selectable or Not Selectable by a User or Machine and Set Accordingly (module 716);

Determine if an Object in a First Layer Partially or Completely Overlaps, Occludes, or Obscures an Object in a Second Layer—If Yes, Adjust Position and/or Orientation of One of the Two Objects (module 717); and Determine if an Object in a First Layer is Likely to Appear to a Viewer to Overlap, Occlude, or Obscure an Object in Another Layer—If Yes, Adjust Position and/or Orientation of One of the Two Objects (module 718).

As described, one or more of the processing steps or stages may be performed continuously on each frame of a video, each image, or each set of content being merged into a multi-layer display.

As mentioned, each module may contain instructions which when executed by a programmed processor cause an apparatus (such as a server or client device) to perform the specific function or functions. The apparatus may be one or both of a client device or a remote server or platform. Therefore, a module may contain instructions that are performed (in whole or in part) by the client device, the server or platform, or both.

As described, embodiments can adjust, modify, or alter both the characteristics of a pixel (e.g., color, brightness, opacity, resolution, or shadowing) and the characteristics of a group of pixels or an object (e.g., position/location, velocity of movement, orientation, or rotation).

There are multiple contexts or use cases in which an embodiment of the disclosure may be used to provide enhanced and more effective display of objects and user interface elements, improve the recognizability of objects, and thereby improve communication and the understanding of content. As non-limiting examples:

Adjustment and placement of objects in a layer or layers to emphasize an object with a border, color, depth, or perspective;

Recognition of text in a layer and conversion or translation of that text into a different language, with the converted text presented in the same or a different layer;

Recognition of text in a layer and processing of the text using a natural language understanding (NLU) model to determine the meaning of the text, and in response to perform or cause to be executed an operation or function, where examples of such operations or functions include but are not limited to:

Initiation of a payment transaction;

Activation of a link, resulting in accessing a data storage location or website;

Retrieval of data or a document from a specified storage location (such as a file, folder, etc.);

Transfer of data or a document to a desired location or user;

Launching of a specific application; or

Generating a message.

Recognition of an object in a layer, processing of the object using a model (such as a CNN based classifier) to determine an operation or function associated with the object, and if desired, executing that operation or function;

For example, a presenter may show visual thumbnails of slides they plan to present and have these "float" in the same view as the video feed from their webcam. The disclosed system may automatically adjust the position of the thumbnails as the presenter's webcam image moves, ensuring that the presenter is not obscured by one of the thumbnails;

In another example, a teacher may be presenting on a blackboard while simultaneously overlapping the image from a webcam video. An embodiment may continuously monitor the ambient color/brightness of the overlapping video layers and adjust the color of the chalk on the blackboard, making it either lighter or darker, to ensure it is able to be viewed more clearly from the rest of the content;

Additional non-limiting examples of contexts, environments, or use cases that may benefit from the disclosed techniques for generating a multi-layer display may include:

As described, in some embodiments, when generating the composite display of multiple layers, a viewer's perspective can be considered. For example, when there is a virtual distance between layers and a viewer moves, the objects can be repositioned, and attributes can be adjusted to accommodate the reality that the viewer is looking at the screen "from the side" instead of from the center of the screen;

In some situations, two viewers may be looking at the same object (e.g., a document) and one may want to see the document more, and the other may want to see the other person's face. For example, in a banking transaction, the customer may want to see the form rather than the banker's face, but the banker may want to see the customer's face rather than the form;

The disclosed techniques may be used to generate displays on devices and systems other than conventional computers or mobile phones. For example, a multi-layer display may be generated on a dashboard screen of an automobile, to display both operational information about a vehicle (such as speed, engine RPM, the status of lights) in addition to a feed generated from a camera inside the vehicle or in another location;

In one embodiment, the disclosed techniques may be used to generate a multi-layer display on a transparent section of glass, for example, on the glass window of a traveling train where at night, the font may be lit differently from what is displayed during the day;

In some embodiments, the disclosed techniques could be used on a glass wall of a smart home or office, where the content displayed would be adjusted based on what is happening behind the glass. In this example, someone looking through the glass wall (which has displayed content) would be able to read displayed text, even if someone with a shirt of the same color as the text passes by, because the system can change the text to a contrasting color at that time;

In a heads-up display such as that in some vehicles, when it is bright outside and a driver is behind a white vehicle, they may not be able to clearly see the heads-up display because its bright white. In this situation, the disclosed techniques may be used to change the heads-up display color to a darker color when the driver is behind a white car;

Similarly, when using smart glasses, if the text is black, and the wearer looks up at the sky to see the stars at night, they may not be able to see the text—in this situation the disclosed techniques can vary the text shown in one layer so that it is more readily seen by the wearer.

Further, as described, in some embodiments one or more signals may be generated that cause a change in the position, movement, or characteristics of a pixel or object, or the appearance of a layer;

these control signals may be generated in response to a detected or identified object or to information gathered from a user's camera, as examples;

for example, knowing where a user is looking can result in automatically selecting an object the user is focusing their view upon, by including the viewer's gaze position as part of the system inputs;

gaze detection may also be used to help calibrate the system—knowing which object a user is looking at and where it exists on one of the layers of a multi-layer display may provide additional information to the rules, models, or algorithms processing object or pixel data;

gaze detection may also be used to alter lenticular or parallax effects on a displayed object or objects;

for example, if a user moves and/or looks to the left/right, the display may be dynamically adjusted so an object or objects appear to the user as if they are "peering into" a 3-dimensional space;

a user's position may be used to "bound" the location of the user as one of the inputs to an object overlap detection and reduction process; or a user's movement may be used in the same way to assist in detecting and avoiding overlap between displayed objects.

This disclosure includes the following embodiments and clauses:

A method of generating a display on a device, comprising: combining content from a plurality of sources into a display, wherein the content from each of the plurality of sources is presented as a layer of the display, and further, wherein each layer of the display is of substantially the same dimensions; detecting one or more objects in each layer of the generated display; and for one or more of the detected objects determining an object type or classification; determining if the object is overlapping or obscuring an object in a different layer of the generated display; determining if the object will appear to a viewer as if it will overlap or obscure an object in a different layer of the generated display as a result of motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modifying a characteristic of the object based on a rule or trained model.

In an embodiment, the characteristic of the object is one or more of a shape, a color, a contrast, a transparency, an opacity, a position, a resolution, or an orientation.

In an embodiment, determining an object type or classification further comprises providing an image of the object to a trained model operating to output a classification of the object.

In an embodiment, the classification of the object is one of text, a human, an animal, or a shape of the object.

In an embodiment, the method further comprises determining if an object should be made selectable or not selectable, and in response setting that characteristic accordingly.

In an embodiment, the sources comprise one or more of a video camera, an application executing on a user's device, or a remote server storing content.

In an embodiment, modifying a characteristic of the object based on a rule or trained model further comprises accessing a rule, a set of rules, or a trained model from a user's device that determine how to process the object.

In an embodiment, the method further comprises performing the steps of detecting one or more objects, determining an object type or classification, determining that the object is overlapping or obscuring an object in a different layer of the generated display, or determining that the object will appear to a viewer as if it will overlap or obscure an object in a different layer, and modifying a characteristic of the object based on a rule or trained model continuously as video content or images are received from the sources.

In an embodiment, if an object is determined to be text expressed in a first language, then the method further comprises: translating the text into a second language; removing the text in the first language; and inserting the text in the second language into the generated display.

A system for generating a display on a device, comprising: one or more electronic processors configured to execute a set of computer-executable instructions; one or more non-transitory electronic data storage media containing the set of computer-executable instructions, wherein when executed, the instructions cause the one or more electronic processors to combine content from a plurality of sources into a display, wherein the content from each of the plurality of sources is presented as a layer of the display, and further, wherein each layer of the display is of substantially the same dimensions; detect one or more objects in each layer of the generated display; and for one or more of the detected objects; determine an object type or classification; determine if the object is overlapping or obscuring an object in a different layer of the generated display; determine if the object will appear to a viewer as if it will overlap or obscure an object in a different layer of the generated display as a result of motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modifying a characteristic of the object based on a rule or trained model.

One or more non-transitory computer-readable media comprising a set of computer-executable instructions that when executed by one or more programmed electronic processors, cause the one or more programmed electronic processors to combine content from a plurality of sources into a display, wherein the content from each of the plurality of sources is presented as a layer of the display, and further, wherein each layer of the display is of substantially the same dimensions; detect one or more objects in each layer of the generated display; and for one or more of the detected objects determine an object type or classification; determine if the object is overlapping or obscuring an object in a different layer of the generated display; determine if the object will appear to a viewer as if it will overlap or obscure an object in a different layer of the generated display as a result of motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modifying a characteristic of the object based on a rule or trained model.

In an embodiment, the characteristic of the object is one or more of a shape, a color, a contrast, a transparency, an opacity, a position, a resolution, or an orientation.

In an embodiment, determining an object type or classification further comprises providing an image of the object to a trained model operating to output a classification of the object.

In an embodiment, the classification of the object is one of text, a human, an animal, or a shape of the object.

In an embodiment, the set of computer-executable instructions, when executed by the one or more programmed electronic processors, cause the one or more programmed electronic processors to determine if an object should be made selectable or not selectable, and in response setting that characteristic accordingly.

In an embodiment, the sources comprise one or more of a video camera, an application executing on a user's device, or a remote server storing content.

In an embodiment, modifying a characteristic of the object based on a rule or trained model further comprises accessing a rule, a set of rules, or a trained model from a user's device that determine how to process the object.

In an embodiment, the set of computer-executable instructions, when executed by the one or more programmed electronic processors, cause the one or more programmed electronic processors to perform the steps of detecting one or more objects, determining an object type or classification, determining that the object is overlapping or obscuring an object in a different layer of the generated display, or determining that the object will appear to a viewer as if it will overlap or obscure an object in a different layer, and modifying a characteristic of the object based on a rule or trained model continuously as video content or images are received from the sources.

In an embodiment, if an object is determined to be text expressed in a first language, then the set of computer-executable instructions, when executed by the one or more programmed electronic processors, cause the one or more programmed electronic processors to: translate the text into a second language; remove the text in the first language; and insert the text in the second language into the generated display.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Machine learning (ML) is being used more and more to enable the analysis of data and assist in making decisions in multiple industries. To benefit from using machine learning, a machine learning algorithm is applied to a set of training data and labels to generate a "model" which represents what the application of the algorithm has "learned" from the training data. Each element (or instances or example, in the form of one or more parameters, variables, characteristics or "features") of the set of training data is associated with a label or annotation that defines how the element should be classified by the trained model. A machine learning model in the form of a neural network is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

In some embodiments, certain of the methods, models, or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. A trained neural network, trained machine learning model, or any other form of decision or classification process may be used to implement one or more of the methods, functions, processes, or operations described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" or nodes that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as Python, Java, JavaScript, C, C++, or Perl using procedural, functional, object-oriented, or other techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Figure 8:
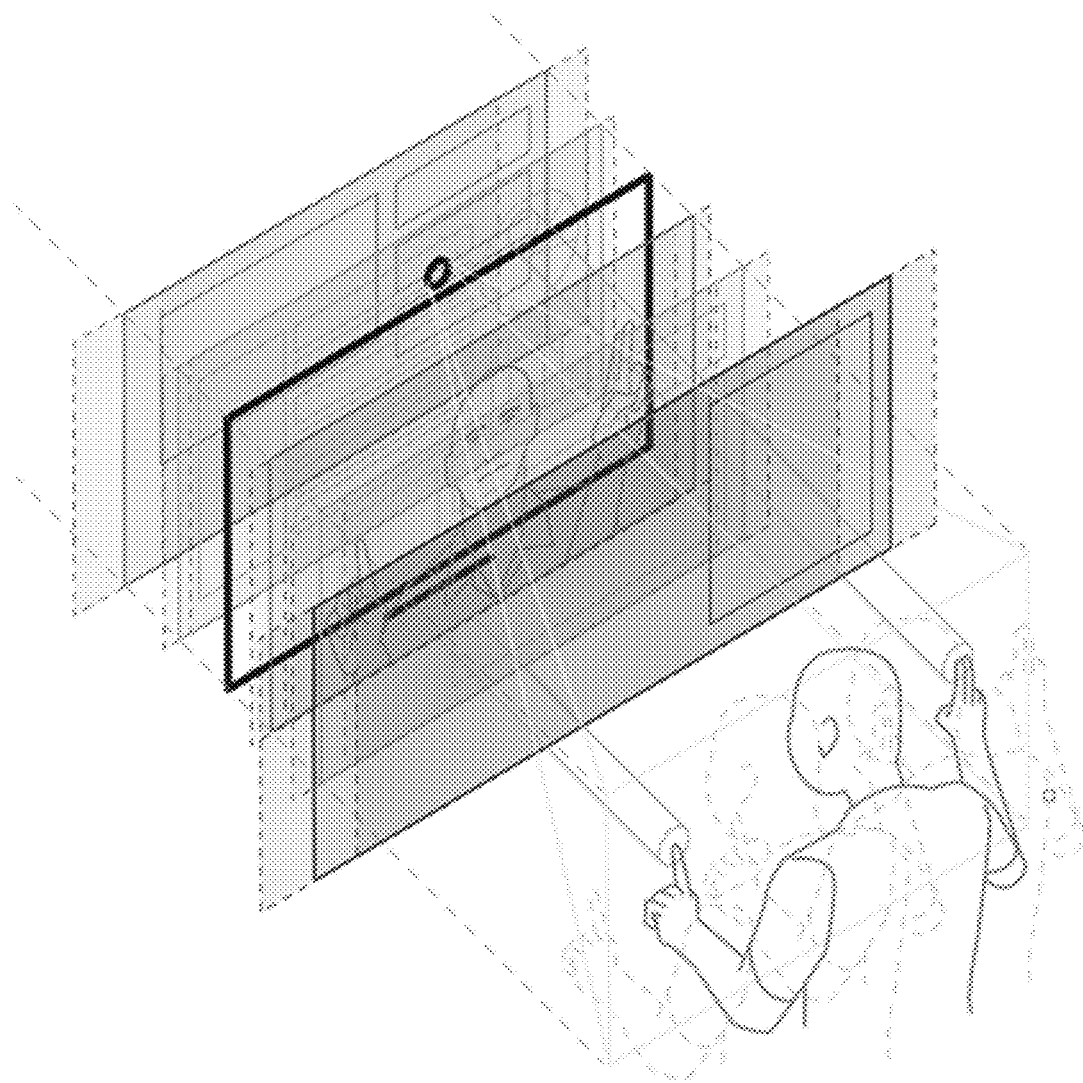
FIG. 8 is an example of Transparent Computing.

As shown in FIG. 8, in some embodiments, one or more of the disclosed functions and capabilities may be used to enable a volumetric composite of content-activated layers of Transparent Computing, content-agnostic layers of Transparent Computing and/or camera-captured layers of Transparent Computing placed visibly behind 2-dimensional or 3-dimensional content displayed on screens, placed in front of 2-dimensional or 3-dimensional content displayed on screens, placed inside of 3-dimensional content displayed on screens and/or placed virtually outside of the display of screens. Users can interact via Touchless Computing with any layer in a volumetric composite of layers of Transparent Computing wherein a user's gaze, gestures, movements, position, orientation, or other characteristics observed by a camera are used as the basis for selecting and interacting with objects in any layer in the volumetric composite of layers of Transparent Computing to execute processes on computing devices.

In some embodiments, one or more of the disclosed functions and capabilities may be used to enable users to see a volumetric composite of layers of Transparent Computing from a 360-degree Optical Lenticular Perspective wherein a user's gaze, gestures, movements, position, orientation, or other characteristics observed by cameras are a basis to calculate, derive and/or predict the 360-degree Optical Lenticular Perspective from which users see the volumetric composite of layers of Transparent Computing displayed on screens. Further, users can engage with a 3-dimensional virtual environment displayed on screens consisting of layers of Transparent Computing placed behind the 3-dimensional virtual environment displayed on screens, placed in front of a 3-dimensional virtual environment displayed on screens, and/or placed inside of the a 3-dimensional virtual environment displayed on screens wherein users can select and interact with objects in any layer of Transparent Computing to execute processes on computing devices while looking at the combination of the 3-dimensional virtual environment and the volumetric composite of layers of Transparent Computing from any angle of the 360-degree Optical Lenticular Perspective available to users.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A method of generating a display on a device, comprising:
   combining content from a plurality of sources into a display, wherein the content from each of the plurality of sources is presented as a layer of the display, and further, wherein each layer of the display is of substantially the same dimensions;
   detecting one or more objects in each layer of the generated display; and
   for one or more of the detected objects determining an object type or classification;

determining if the object is overlapping or obscuring an object in a different layer of the generated display;

determining if the object will appear to a viewer as if it will overlap or obscure an object in a different layer of the generated display as a result of motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modifying a transparency of the object based on a rule or trained model.

2. The method of claim 1, wherein modifying based on a rule or trained model further comprises modifying a shape, a color, a contrast, an opacity, a position, a resolution, or an orientation.

3. The method of claim 1, wherein determining an object type or classification further comprises providing an image of the object to a trained model operating to output a classification of the object.

4. The method of claim 3, wherein the classification of the object is one of text, a human, an animal, or a shape of the object.

5. The method of claim 1, further comprising determining if an object should be made selectable or not selectable, and in response setting that transparency accordingly.

6. The method of claim 1, wherein the sources comprise one or more of a video camera, an application executing on a user's device, or a remote server storing content.

7. The method of claim 1, wherein modifying based on a rule or trained model further comprises accessing a rule, a set of rules, or a trained model from a user's device that determine how to process the object.

8. The method of claim 1, further comprising performing the steps of detecting one or more objects, determining an object type or classification, determining that the object is overlapping or obscuring an object in a different layer of the generated display, or determining that the object will appear to a viewer as if it will overlap or obscure an object in a different layer, and modifying a transparency of the object based on a rule or trained model continuously as video content or images are received from the sources.

9. The method of claim 1, wherein if an object is determined to be text expressed in a first language, then the method further comprises:

translating the text into a second language;

removing the text in the first language; and inserting the text in the second language into the generated display.

10. The method of claim 1, wherein modifying based on a rule or trained model further comprises modifying a shape, a color, a contrast, an opacity, a position, a resolution, and an orientation.

11. A system for generating a display on a device, comprising:

one or more electronic processors configured to execute a set of computer-executable instructions;

one or more non-transitory electronic data storage media containing the set of computer-executable instructions, wherein when executed, the instructions cause the one or more electronic processors to combine content from a plurality of sources into a display, wherein the content from each of the plurality of sources is presented as a layer of the display, and further, wherein each layer of the display is of substantially the same dimensions;

detect one or more objects in each layer of the generated display; and for one or more of the detected objects;

determine an object type or classification;

determine if the object is overlapping or obscuring an object in a different layer of the generated display;

determine if the object will appear to a viewer as if it will overlap or obscure an object in a different layer of the generated display as a result of motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modify a transparency of the object based on a rule or trained model.

12. One or more non-transitory computer-readable media comprising a set of computer-executable instructions that when executed by one or more programmed electronic processors, cause the one or more programmed electronic processors to combine content from a plurality of sources into a display, wherein the content from each of the plurality of sources is presented as a layer of the display, and further, wherein each layer of the display is of substantially the same dimensions;

detect one or more objects in each layer of a generated display; and for one or more of the detected objects determine an object type or classification;

determine if the object is overlapping or obscuring an object in a different layer of the generated display;

determine if the object will appear to a viewer as if it will overlap or obscure an object in a different layer of the generated display as a result of motion, orientation, or gaze of the viewer; and based on the object's type or classification, a determination that the object is overlapping or obscuring an object in a different layer of the generated display, or a determination that the object will appear to a viewer as if it will overlap or obscure an object in a different layer, modify a transparency of the object based on a rule or trained model.

13. The one or more non-transitory computer-readable media of claim 12, wherein modifying based on a rule or trained model further comprises modifying a shape, a color, a contrast, an opacity, a position, a resolution, or an orientation.

14. The one or more non-transitory computer-readable media of claim 12, wherein determining an object type or classification further comprises providing an image of the object to a trained model operating to output a classification of the object.

15. The one or more non-transitory computer-readable media of claim 14, wherein the classification of the object is one of text, a human, an animal, or a shape of the object.

16. The one or more non-transitory computer-readable media of claim 12, wherein the set of computer-executable instructions, when executed by the one or more programmed electronic processors, cause the one or more programmed electronic processors to determine if an object should be made selectable or not selectable, and in response setting that transparency accordingly.

17. The one or more non-transitory computer-readable media of claim 12, wherein the sources comprise one or more of a video camera, an application executing on a user's device, or a remote server storing content.

18. The one or more non-transitory computer-readable media of claim 12, wherein modifying based on a rule or trained model further comprises accessing a rule, a set of rules, or a trained model from a user's device that determine how to process the object.

19. The one or more non-transitory computer-readable media of claim 12, wherein the set of computer-executable instructions, when executed by the one or more programmed electronic processors, cause the one or more programmed electronic processors to
perform the steps of detecting one or more objects, determining an object type or classification, determining that the object is overlapping or obscuring an object in a different layer of the generated display, or determining that the object will appear to a viewer as if it will overlap or obscure an object in a different layer, and modifying a transparency of the object based on a rule or trained model continuously as video content or images are received from the sources.

20. The one or more non-transitory computer-readable media of claim 12, wherein if an object is determined to be text expressed in a first language, then the set of computer-executable instructions, when executed by the one or more programmed electronic processors, cause the one or more programmed electronic processors to:
translate the text into a second language;
remove the text in the first language; and
insert the text in the second language into the generated display.

* * * * *